United States Patent [19]

Leverenz

[11] Patent Number: 4,913,912

[45] Date of Patent: * Apr. 3, 1990

[54] PLASTIC INJECTION MOLD APPARATUS WITH MULTIPLE TIP TORPEDO HEATER

[75] Inventor: David Leverenz, Elk Grove Village, Ill.

[73] Assignee: Fast Heat Element Manufacturing Co., Inc., Elmhurst, Ill.

[*] Notice: The portion of the term of this patent subsequent to Jul. 5, 2005 has been disclaimed.

[21] Appl. No.: 179,531

[22] Filed: Apr. 8, 1988

Related U.S. Application Data

[63] Continuation-in-part of Ser. No. 913,020, Sep. 29, 1986, Pat. No. 4,755,126, which is a continuation-in-part of Ser. No. 817,008, Jan. 8, 1986, abandoned.

[51] Int. Cl.⁴ .............................................. B29C 45/22
[52] U.S. Cl. ............................... 425/549; 264/328.15; 425/510; 425/572; 425/588
[58] Field of Search ................ 425/144, 547, 549, 570, 425/572, 588; 264/328.15

[56] References Cited

U.S. PATENT DOCUMENTS

| | | | |
|---|---|---|---|
| 3,911,251 | 10/1975 | Day | 219/501 |
| 4,230,934 | 10/1980 | ter Beek et al. | 425/144 |
| 4,279,582 | 7/1981 | Osuna-Diaz | 425/549 |
| 4,340,353 | 7/1982 | Mayer | 425/549 |
| 4,373,132 | 2/1983 | Vartanian | 425/549 |
| 4,376,244 | 3/1983 | Gellert | 425/549 |
| 4,433,969 | 2/1984 | Gellert | 425/549 |

FOREIGN PATENT DOCUMENTS

| | | |
|---|---|---|
| 681228 | 10/1966 | Belgium . |
| 43234 | 1/1982 | European Pat. Off. . |
| 144532 | 6/1985 | European Pat. Off. . |
| 162438 | 11/1985 | European Pat. Off. . |
| 2716950 | 1/1978 | Fed. Rep. of Germany . |
| 625461 | 9/1981 | Switzerland . |

OTHER PUBLICATIONS

Kona-Heat Pipe Technology Brochure.
Von Ing. O. Heuel, "Werkzeugbau-Aspekte unter Berucksichtigung von Normalien", 1981.

Primary Examiner—Jay H. Woo
Assistant Examiner—Timothy W. Neitbrink
Attorney, Agent, or Firm—Leydig, Voit & Mayer

[57] ABSTRACT

A plastic injection mold apparatus which includes a multiple tip torpedo heater in the fluid plastic flow passageway. The torpedo heater includes a pair of substantially identical tip members and a mounting collar which together define an exposed outer cylindrical surface of substantially uniform diameter with a tip at each end thereof over which the fluid plastic material may be directed at an elevated temperature. The tip members each are formed with an internal bore for receiving a respective electrical heating element, the leads of which exit the heater through the central mounting collar. The torpedo heater is retained in mounted position by means of a removable bushing, which permits relatively easy removal and replacement of the heater. The mounting collar and bushing each are formed so that an insulating air space is defined about their outer peripheries for enhancing the energy efficient operation of the molding operation.

34 Claims, 2 Drawing Sheets

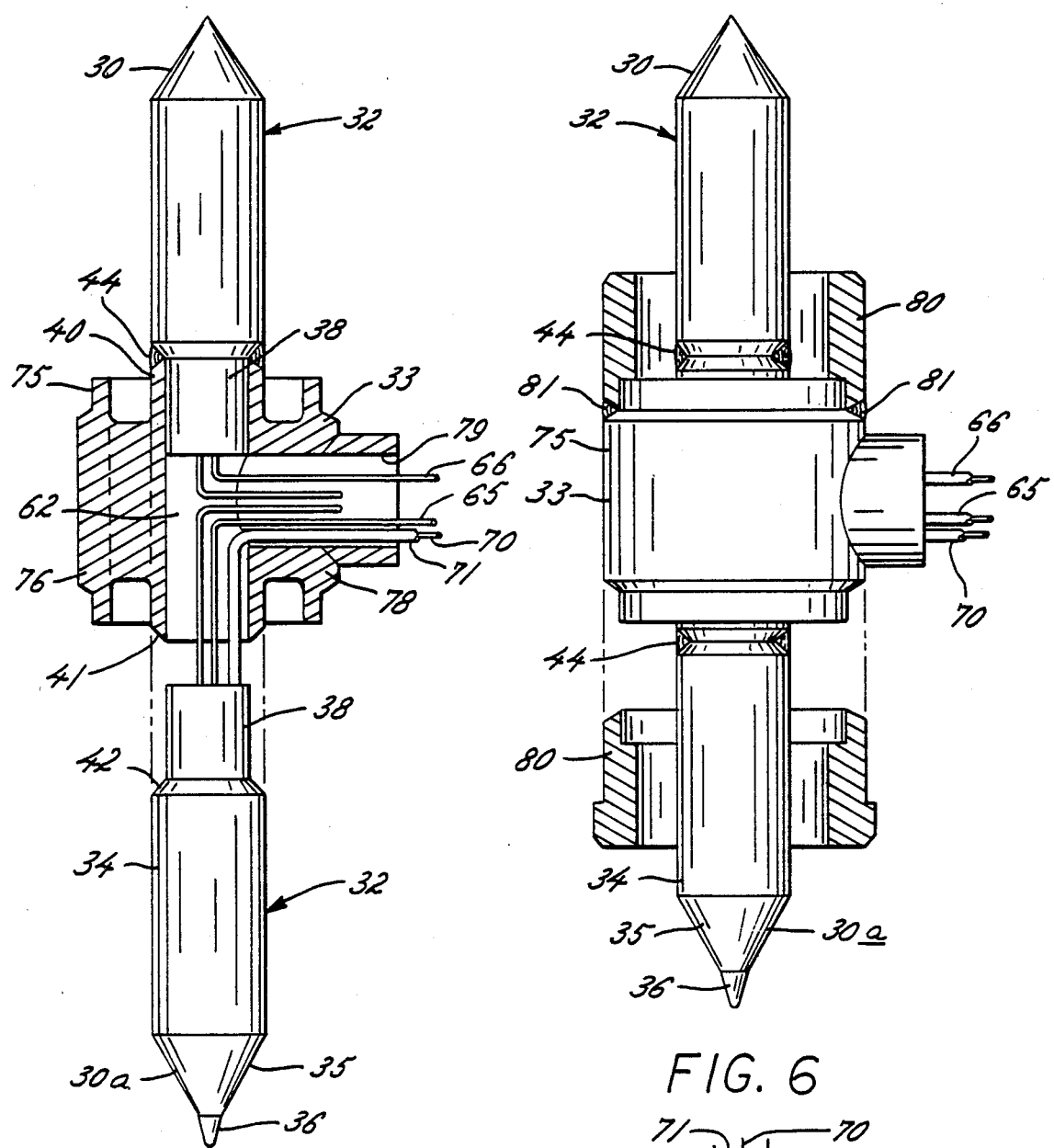
FIG. 5
FIG. 6
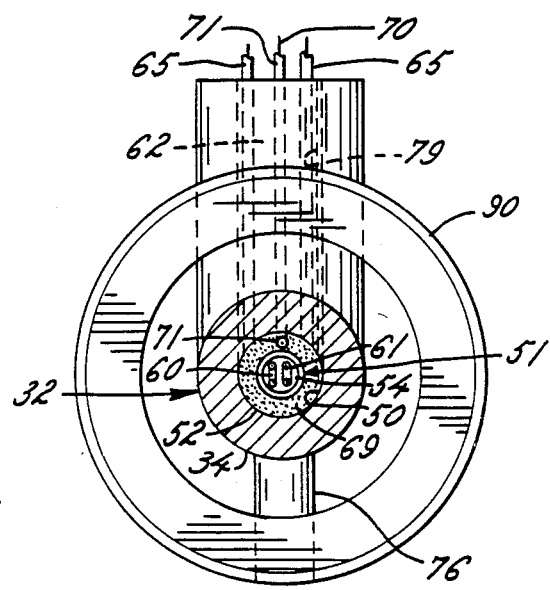
FIG. 4

PLASTIC INJECTION MOLD APPARATUS WITH MULTIPLE TIP TORPEDO HEATER

DESCRIPTION OF THE INVENTION

This application is a continuation-in-part of application Ser. No. 913,020 filed Sept. 29, 1986, now U.S. Pat. No. 4,755,126, which in turn was a continuation-in-part of application Ser. No. 817,008 filed Jan. 8, 1986 now abandoned.

The present invention relates generally to plastic injection molding equipment, and more particularly, to an improved torpedo heater and mounting arrangement therefore in such equipment.

In plastic injection molding equipment it generally is necessary that each passageway in the mold apparatus through which fluid plastic passes during its travel to a mold cavity be heated to a predetermined temperature range in order to enable the proper material flow. For this purpose, it is common to utilize torpedo heaters and the like in each passageway. In injection molding equipment in which there is provided a plurality of mold cavities for simultaneous molding of a plurality of parts, it usually is necessary that the sprue passageways to each cavity be heated in such manner. As a result, the number of mold cavities that can be included in the equipment can be limited by space considerations.

Moreover, since the molding equipment typically comprises a plurality of manifold and mold cavity plates, through which the sprue passageways are directed, leakage from the passageways sometimes can occur between the plates. In the event that the electrical leads to the heaters are adjacent the flow passageways, they can become contaminated, resulting in costly shutdowns of molding operations and difficult cleaning tasks. In many conventional molds, it is difficult to obtain access to and effect removal and replacement of torpedo heaters in the event of such leakage or when replacement of the heater is required. Furthermore, while it is desirable to have tight fitting relationships between mating parts in the mold so as to prevent such leakage, when the mountings for the heaters are tightly held against the manifold and cavity plates, increased heat conduction can occur between the heater and such plates, resulting in lose of heat to the flow stream and reduced operating efficiency for the molding operation.

It is an object of the present invention to provide a relatively compact and more efficiently operable plastic injection mold apparatus.

Another object is to provide a plastic injection mold apparatus with an improved multiple-tip torpedo heater adapted for more efficient and fail safe operation.

A further object is to provide a heater mounting arrangement that more effectively isolates the electrical leads of the heater from the fluid plastic passageways in the mold manifold and cavity plates.

Still another object is to provide a torpedo heater mounting arrangement as characterized above that is designed to minimize heat transfer to mold manifold and cavity plates and thereby enhance the energy efficiency of the molding operation.

Yet another object is to provide a mold heater mounting arrangement of the foregoing type which facilitates relatively easy removal and replacement of the torpedo heater.

Other objects and advantages of the invention will become apparent upon reading the following detailed description and upon reference to the drawings in which:

FIG. 4 is a transverse section of the torpedo heater taken in the plane of line 4—4 in FIG. 2; and FIGS. 5 and 6 are fragmentary sections depicting assembly of the illustrated torpedo heater.

Figure 1:
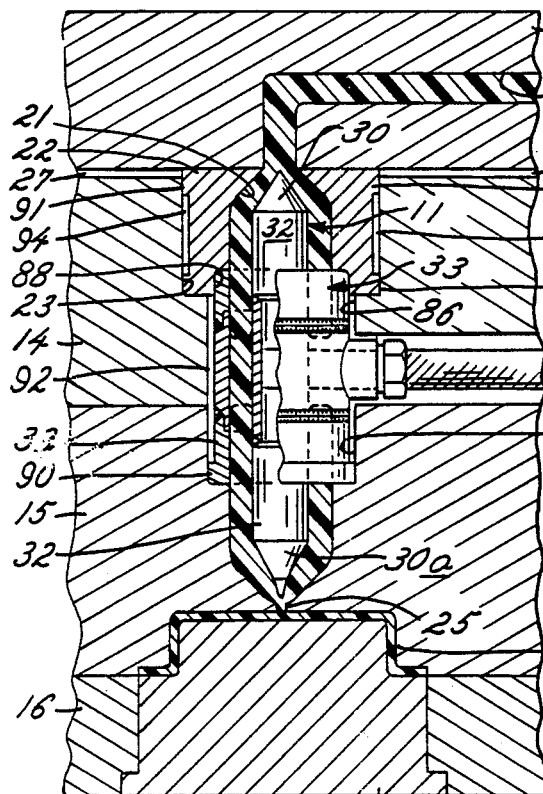
FIG. 1 is a section of a plastic injection mold apparatus embodying the present invention.

While the invention is susceptible of various modifications and alternative constructions, a certain illustrated embodiment thereof has been shown in the drawings and will be described below in detail. It should be understood, however, that there is no intention to limit the invention to the specific form disclosed, but on the contrary, the intention is to cover all modifications, alternative constructions and equivalents falling within the spirit and scope of the invention.

Referring now more particularly to FIG. 1 of the drawings, there is shown an illustrative plastic injection mold apparatus 10 having a multiple tip torpedo heater 11 embodying the present invention. The mold apparatus 10 in this instance includes outer and inner manifold plates 12, 14, respectively, a mold cavity plate 15, and a core plate 16, the latter containing a core insert 18. The outer manifold plate 12 is formed with a sprue passageway 20, which may be coupled to a fluid plastic supply source, such as a conventional plastic injection nozzle, and may be externally heated in a conventional manner. The sprue passageway 20 in this case communicates with a sprue inlet 21 of an annular bushing 22 located within an outwardly facing counter bore 23 of the inner manifold plate 14 in interposed relation between the inner and outer manifold plates 14, 12. The bushing 32 has a length that is slightly greater than the depth of the counter bore 23 so as to maintain a relatively small spacial separation 27 between the inner and outer manifold plates 14, 12. The cavity plate 15, core plate 16 and core insert 18 together define a mold cavity 24 in a conventional manner with an entry gate 25 communicating therewith. As shown in FIG. 1, the torpedo heater 11 has a tip 30 at one end thereof formed with a tapered configuration and disposed in concentric relation to a tapered entry of the sprue inlet 21, and a tip 30a at the opposite end thereof disposed in concentric relation to a tapered entry to the gate 25. The torpedo heater 11 in this instance is disposed in the flow path between the inlet 21 and gate 25 so that a fluid plastic flow stream passes over the entire length of the torpedo heater and is maintained in the desired temperature range during such travel.

Figure 2:
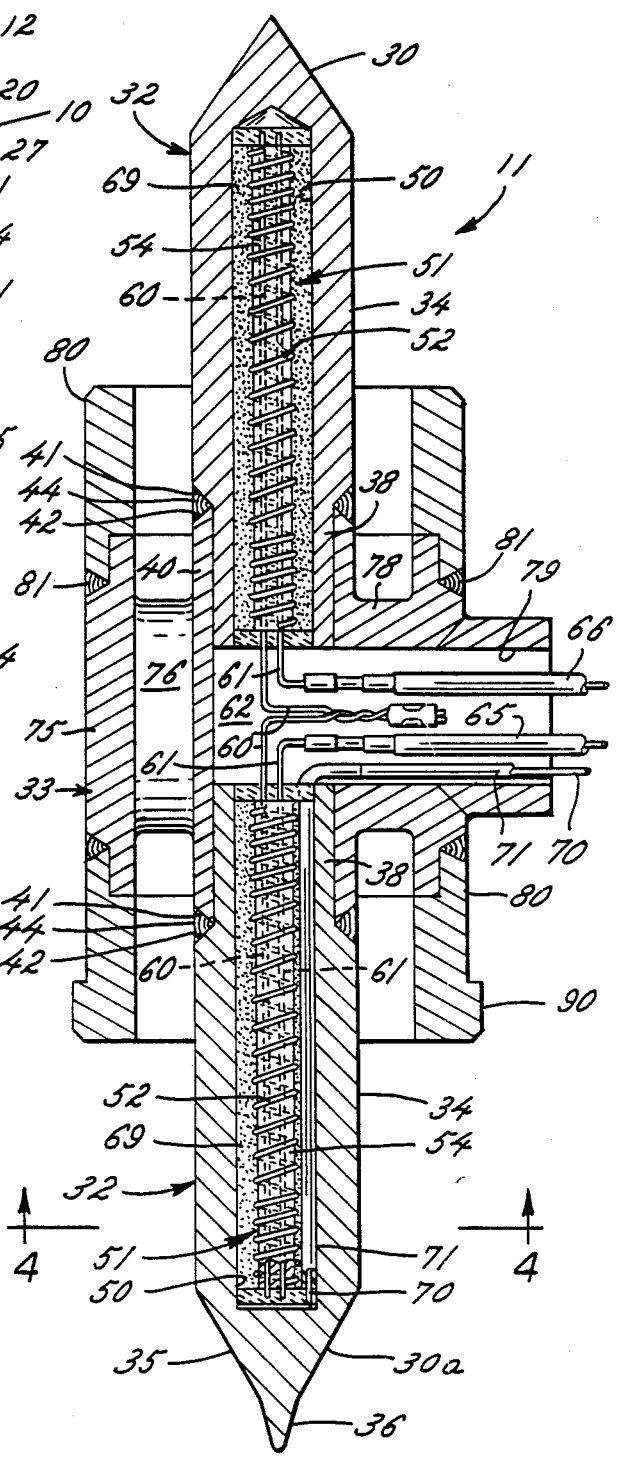
FIG. 2 is an enlarged longitudinal section of the multiple tipped torpedo included in the mold apparatus shown in FIG. 1.

In accordance with one aspect of the invention, the multiple tip torpedo heater has a three part construction comprising a pair of substantially similar tip members and a central collar which facilitates mounting of the heater within the mold apparatus and coupling of the heater to an outside electrical source. To this end, the illustrated torpedo heater 11 comprises a pair of tip members 32 and a central collar 33. The tip members 32 each have a cylindrical body portion 34, with one of the body portions in this instance being formed with the tapered tip 30 and the other of the body portions being formed with the tapered tip 30a. In the illustrated embodiment, the tip 30 has a straight frustriconical configuration while the tip 30a has a relatively wide angle frustriconical initial portion 35 and a relatively narrow angle conical terminal tip portion 36, as shown in FIG. 2. The tip members 32 each have reduced diameter shanks 38 at their opposite ends that are positionable within respective opposed ends of an inner cylindrical portion 40 of the collar 33. The cylindrical body portions 34 of the tip members 32 and the inner cylindrical portion 40 of the collar 33 define a substantially uninterrupted uniform-diameter outer periphery of the torpedo heater along the length of the torpedo heater. The outer ends of the inner cylindrical portion 40 of the collar 33 are formed with chamfers 41, which are positionable into adjacent relation with chamfers 42 formed on the respective tip member 32 for defining V-shaped annular recesses for receiving weldments 44 which also have an outer periphery substantially in the plane of the outer cylindrical surface of the torpedo heater. While in the illustrated embodiment the tip members 32 are of identical length, it will be understood that tip members of different lengths may be utilized to accommodate particular mold or part configurations.

Figure 3:
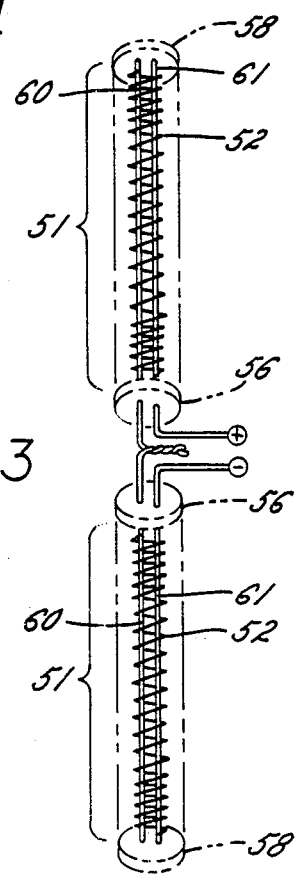
FIG. 3 is a diagrammatic illustration of the electrical winding and lead pin arrangement of the illustrated torpedo heater.

For electrically heating respective halves of the torpedo heater, the tip members 32 each are formed with an elongated internal bore 50 which extends from an inner end of the tip member 32 to a location adjacent the respective tip 30, 30a and which each contains a respective heating element 51. The heating elements 51 each comprise a resistance wire 52 wound on a ceramic core 54, the latter each having a diameter less than the diameter of the bore 50 and being positionable into a respective bore 50 of the tip member. The cores 54 each are interposed between pairs of relatively thin frangible spacers 56, 58. The spacer 56 for each heating element is positioned adjacent the innermost end of the tip member 32 and the tip members 32 are supported within the collar 33 such that an axial space 62 is located between the tip members 32 centrally within the collar 33. The heating elements 51 each further have a pair of lead pins 60, 61 which extend through the respective core 54 and spacers 56, 58. One end of each resistance wire 52 is connected to one of the lead pins 61 adjacent one end of the core 54 and the other end of the resistance wire 52 is connected to the other lead pin 60 adjacent the opposite end of the core, as illustrated in FIGS. 2 and 3.

The resistance wires 52 for heating elements 51 in this instance are electrically connected in series. For this purpose, the inner ends of the lead pins 60, 61 for the heating elements 51 extend into the space 62 between the heating elements 51, with the ends of the pins 60 being connected together by a coupler 64 and the ends of the lead pins 61 being connected to a respective electrical leads 65, 66. While individual pairs of lead pins 60, 61 are shown for the heating elements 51, it will be understood that alternatively the lead pins 60 could be a single common pin which extends longitudinally through the cores of both heating elements It also will be appreciated that, alternatively, the resistance wires 52 for the respective heating elements could be connected electrically in parallel, or the resistance wires each could be independently connected to an electrical source so as to permit independent control of the temperature of each tip member.

To compensate for irregular heat drains or losses along the length of the torpedo heater 11, and thus provide a more uniform heat profile along the torpedo heater, the electrical windings 52 may be shaded or concentrated at selected locations. In the illustrated embodiment, the windings 52 are concentrated, as illustrated in FIGS. 2 and 3, adjacent opposite ends of each of the heating elements 51.

During the manufacture of the torpedo heater 30, heat transmitting material 69, such as magnesium oxide powder or similar material, is deposited in the space between the core 54 and the respective bore 50 in the tip member. The assembly then preferably is vibrated to pack the magnesium oxide powder tightly within the bore 50 to fill all air voids within the assembly. Means, such as an adhesive, may be provided for temporarily retaining the spacer 56 in position so as to tightly retain the magnesium oxide powder within the casing.

The assembly of the tip member and heating element is then swagged so as to reduce the diameter of the bore 50 and compress the packed magnesium oxide powder within the bore. This provides an effective heat transfer contact between the heating elements and the tip member for enhancing efficient and uniform heat transfer to the tip member. Following swagged, the adhesive or other means utilized for temporarily retaining the spacer 56 within the tip member may be removed, with the spacers being fixedly retained in mounted position by the resulting tight friction force For controlling the temperature of the heating elements 51, a thermocouple probe 70 is provided in one of the heating elements. In the illustrated embodiment, a hypotube 71 is disposed adjacent the perimeter of the bore 50 of one of the tip member 32 and is embedded in the magnesium oxide powder 69, and the thermocouple probe 70 is housed within the hypotube 71 and extends to a position adjacent the tip of the heater for sensing the temperature at such point. It will be understood by one skilled in the art that power to the heating elements may thereby be selectively controlled in a known manner.

In keeping with the invention, the collar 33 of the torpedo heater 11 has integrally formed means for defining an exit aperture for the electrical leads and for supporting the torpedo heater intermediate its ends in concentric relation within a fluid plastic flow passageway so as to permit the flow of fluid plastic material along the entire length of the torpedo heater. To this end, the collar 33 is formed with an outer cylindrical portion 75 which is supported in concentric relation to the inner cylindrical portion 40 by a pair of integrally formed radial portions 76, 78. The radial portion 78 in this instance is formed with a radial passageway 79 which extends through both the outer and inner cylindrical portions 75, 40 into communication with the space 62 between the inner ends of the tip members 32 so as to permit the exit of the leads 65, 66 and thermocouple probe 70 outwardly of said torpedo heater at said central location between the ends thereof. Because the electrical leads exit at a location which is remote from both the sprue inlet and mold cavity gate, it will be appreciated that even if some leakage of the fluid plastic flow stream should occur, the electrical leads are less susceptible to contamination. To facilitate mounting of the torpedo heater 11, the outer cylindrical portion 75 of the collar 33 is provided with axial cylindrical extensions 80 on each side thereof. Mating ends of the outer cylindrical portion 75 and the extensions 80 are champhered to define recesses for appropriate weldments 81. It will be understood that, alternatively, the outer cylindrical portion 75 of the collar 33 could be formed as a single longer member.

In carrying out an important aspect of the invention, the torpedo heater is mounted for easy removability and is adapted for more thermally efficient operation. For this purpose, the cavity plate 15 and inner manifold plate 14 are formed with respective aligned bores within which the collar 33 of the torpedo heater 11 is disposed, and the bushing 22 is adapted for removably retaining the torpedo heater 11 in mounted position. In the illustrated embodiment, the cavity plate 15 is formed with an upwardly opening counter bore 85, as viewed in FIG. 1, which is disposed in concentric relation with a similarly sized bore 86 in the manifold plate 14, which together are adapted for receiving the collar 33 of the torpedo heater 11. The bushing receiving counter bore 23 in the manifold plate 14 is of larger diameter than the bores 85, 86 and is disposed upstream thereof (upwardly thereof as viewed in FIG. 1) for removably receiving the bushing 22. To facilitate assembly of the torpedo heater 11, the bushing 22 is formed with a recess 88 for receiving and retaining the upstream end of the collar 33, as shown in FIG. 1. To facilitate assembly of the torpedo heater and bushing in the mold apparatus, the outer manifold plate 12 typically is removable with respect to the inner manifold plate 14, as is known in the art. Upon closure of the outer manifold plate 12, it will be seen that the bushing 22 is maintained in interposed relation between the counter bore 23 in the cavity plate 14 and the underside of the outer manifold plate 12, creating axial sealing areas along about the opposed ends of the bushing 22.

In keeping with the invention, the torpedo heater collar 33 and mounting bushing 22 are formed with radial flanges which create radial sealing areas and define insulating air spaces about the outer peripheries of the collar 33 and bushing 22 for enhancing the energy efficient operation of the mold apparatus. In the illustrated embodiment, the collar 33 is formed with a radial flange 90 adjacent the downstream end thereof which is effective for defining a thin annular air insulating spacing 92 about the outer periphery of the collar 33 between the radial flange 90 and the opposite end of the collar 22 that is retained in the bushing 22. The bushing 22 is formed with radial flanges 91 adjacent opposed ends which similarly define an annular air insulating space 94 about the bushing between the radial flanges thereof. The radial flanges 90, 91 are sized with respect to the bores within which they are disposed such that upon expansion incident to exposure to the operating temperature of the mold, a tight seal exists about the outer periphery of the flanges and the bore. Thermal expansion also may be considered in determining the sealing pressure between the opposed ends of the collar 33.

In operation of the plastic injection molding apparatus 10, molten plastic may be directed from a supply nozzle into the sprue passageway 20 to the sprue inlet 21, and then pass along the entire length of the torpedo heater 11 to the gate 25 for the cavity 24, with the torpedo heater 11 being adapted for maintaining the fluid plastic along its flow path between the sprue inlet 21 and gate 25 within a determined temperature range. The collar 33 and bushing 22 support the torpedo heater and define a plurality of axial and radial sealing areas for more reliably maintaining a sealed condition along the fluid plastic flow path. They further define the annular air insulating spaces 92, 94 about the collar 33 and bushing 22 for minimizing outward heat transfer through the inner manifold plate 14 and cavity plate 15, which together with the air gap 27 between the inner and outer manifold plates 14, 12, enhances the energy efficiency of the operation. In the event it becomes necessary to remove the heater for service or cleaning, this may be readily accomplished by separating the manifold plate 14 from the cavity plate 15 in a conventional manner, and withdrawing the torpedo heater 30 and collar 33 from the bushing 22.

From the foregoing, it will be appreciated by one skilled in the art that the present invention provides a relatively compact an efficiently operable plastic injection mold apparatus. The multiple tip torpedo heater is adapted for more efficient and fail safe operation, and the mounting arrangement therefore permits easy removability and replacement.

I claim as my invention:

1. A plastic injection molding system comprising
   means defining a generally cylindrical bore with tapered opposite ends communicating with respective small diameter gates through which fluid plastic material is directed,
   means defining a mold cavity in communication with at least one of said gates,
   a composite torpedo heater comprising a pair of tip members and a mounting collar interposed between said tip members, said tip members each having a tapered, pointed tip at one end thereof, said tip members and mounting collar exposed outer cylindrical surface with said tips at opposite ends thereof,
   means supporting said torpedo heater concentrically in said bore with said tips each in closely adjacent relation to one of said gates and with said exposed outer surface and said bore defining an unobstructed annular fluid plastic flow passageway about each said tip and a portion of said outer cylindrical surface adjacent said tip and substantially along the entire length of said outer cylindrical surface through which fluid plastic material is directed at an elevated temperature, said annular flow passageway having a radial width defined by the distance between said outer cylindrical surface and the inner perimeter of said cylindrical bore that is less than the diameter of said outer cylindrical surface,
   said tip members being formed with an internal bore at the location of each said tip, said outer cylindrical surface defined by said tip members and collar having a diameter of about twice the diameter of said tip member bores so as to define a thick wall about the respective tip member bore,
   electrical heating means disposed in the bore of each tip, said electrical heating means comprising a core with a resistance wire disposed thereon and heat transmitting material surrounding the resistance wire and core, said heat transmitting material being compacted about the resistance wire and core for filling all air voids therebetween and effecting efficient heat transfer;
   means exiting said outer cylindrical surface intermediate the ends thereof for electrically coupling said heating means to a power source for enabling heating of said heating means and heat conduction outwardly through said tip member walls for heating fluid plastic material directed through said flow passageway and over said tips to a desired temperature independent of temperature conditions external to said torpedo heater, and means for controlling the temperature of said heating means and thus the temperature of said tips and fluid plastic material directed through said passageway and over said tips.

2. The plastic injection molding system of claim 1 in which said tip members each are substantially identical.

3. The plastic injection molding system of claim 1 in which said tip members each are substantially equal in length.

4. The plastic injection molding system of claim 1 in which said tip members and mounting collar define an exposed outer cylindrical surface of substantially uniform diameter with said tips at opposite ends thereof.

5. The plastic injection molding system of claim 1 in which said collar has a first cylindrical portion, and said tip members extend axially outwardly from opposite sides of said first cylindrical portion.

6. The plastic injection molding system of claim 5 in which said collar has an outer cylindrical portion of larger diameter than said first cylindrical portion and integrally formed means for supporting said outer cylindrical portion in concentric relation to said first cylindrical portion for defining a flow passageway therebetween.

7. The plastic injection molding system of claim 6 in which said tip members each have a cylindrical body portion with said tapered pointed tip at an outer end thereof.

8. The plastic injection molding system of claim 1 in which said electrical heating means includes an individual electrical heating element disposed in the bore of each said tip member.

9. The plastic injection molding system of claim 8 in which said heating elements have connector pins extending through the cores thereof, said heating element resistant wires being connected to selected of said pins, and means for coupling said pins to said power source.

10. The plastic injection molding system of claim 9 in which the resistance wires for said hating elements are connected to respective individual pairs of said connector pins.

11. The plastic injection molding system of claim 9 in which said resistance wires for said heating elements are electrically connected in series with said power source.

12. The plastic injection molding system of claim 9 in which said collar includes a cylindrical portion that defines an internal axial space between said tip members, at least some of said connector pins for said heating elements extending into said internal space, said collar being formed with a radial passage communicating with said internal space, and said electrical coupling means including means extending through said radial passage for connecting said connector pins to said power source.

13. A plastic injection mold apparatus comprising a plurality of plates, means defining a fluid passage through said plates, a torpedo heater disposed in said fluid passage and having an exposed outer surface over which fluid plastic material is directed during travel through said passage, said torpedo heater having tips at opposed outermost ends thereof and a mounting collar located intermediate said tips, said plates being formed with a first bore for receiving said torpedo heater collar, said plates being formed with a second bore, a removable bushing disposed in said second bore between one of said plates and an end of said second bore for retaining said collar and torpedo heater in mounted position, said torpedo heater being formed with an internal bore at the location of each said tip, electrical heating means disposed in the bore of each said tip, means for electrically coupling said heating means to a power source for heating said heating means and tips independent of temperature conditions of external of said torpedo heater, and means for controlling the temperature of said heating means and thus the temperature of said tips.

14. THe plastic injection mold apparatus in claim 13 in which said plates include a removable outer manifold plate, said collar having upstream and downstream ends, and said removable bushing being disposed between said outer manifold plate and an upstream end of said collar.

15. The plastic injection mold apparatus of claim 13 in which said plates include inner and outer manifold plates, said inner manifold plate being formed with a counter bore for receiving said bushing, and said bushing having a length that is greater than the depth of said bushing receiving counter bore for maintaining a predetermined spacial separation between said inner and outer manifold plates.

16. The plastic injectionable apparatus of claim 13 in which the tip of one of said tip members is positioned within said bushing for defining a flow passageway between the tip of said one tip member and said bushing.

17. The plastic injection mold apparatus of claim 13 in which said torpedo heater includes a pair of tip members extending outwardly from opposed sides of said collar.

18. The plastic injection mold apparatus of claim 17 in which said tip members each are substantially identical.

19. The plastic injection mold apparatus of claim 17 in which said tip members and mounting collar define an exposed outer cylindrical surface of substantially uniform diameter.

20. The plastic injection mold apparatus of claim 17 in which said collar has a first cylindrical portion, and said tip members extend axially outwardly from opposite sides of said first cylindrical portion.

21. The plastic injection mold apparatus of claim 20 in which said collar has an outer cylindrical portion of larger diameter than said first cylindrical portion and integrally formed means for supporting said outer cylindrical portion in concentric relation to said first cylindrical portion for defining a flow passageway therebetween.

22. The plastic injection mold apparatus of claim 20 in which said first cylindrical portion of said collar supports said tip members with an internal axial space therebetween.

23. The plastic injection mold apparatus of claim 22 in which said collar is formed with a radial passage communicating with said internal space.

24. The plastic injection mold apparatus of claim 23 in which said heating elements each have connector pins extending through the cores thereof, said heating element resistant wires being connected to selected of said pins, and means for coupling said pins to said power source.

25. The plastic injection mold apparatus of claim 22 in which said electrical heating means includes an individual electrical heating element disposed in the bore of each said tip member, each said heating element comprising a core with a resistance wire disposed thereon and heat transmitting material compacted in the bore and surrounding each heating element for electrically insulating the heating element from the tip member and filling all air voids between said tip member and said heating element to effect direct heat transfer to the tip member from the heating element.

26. The plastic injection mold apparatus of claim 25 in which said collar defines an internal axial space between said tip members, at least some of said connector pins for said heating elements extending into said internal space, said collar being formed with a radial passage communicating with said internal space, and said electrical coupling means including means extending through said radial passage for connecting said connector pins to said power source.

27. A torpedo heater comprising a pair of tip members and a mounting collar interposed between said tip members, said tip members and mounting collar defining an exposed outer cylindrical surface with a tip at each end thereof over which a fluid material may be directed at an elevated temperature, said tip members each having a cylindrical body portion with a tapered tip at one end thereof and a reduced diameter shank at an opposite end thereof, said collar having a first cylindrical portion and an outer cylindrical portion of larger diameter than said first cylindrical portion, said collar having integrally formed means for supporting said outer cylindrical portion in concentric relation to said first cylindrical portion and defining a flow passageway therebetween, said tip members being mounted in axially extending relation from opposite sides of said first cylindrical collar portion with the shank portions thereof being positioned in said first first cylindrical collar portion, said tip members each being formed with an internal bore, electrical heating means disposed in the bore of each said tip member for heating said tip members, means for electrically coupling said heating means to a power source, and means for controlling the temperature of said heating means and tip members.

28. The torpedo heater of claim 27 in which said first cylindrical portion of said collar supports said tip members with an internal axial space therebetween.

29. The torpedo heater of claim 28 in which said collar is formed with a radial passage communicating with said internal space.

30. A plastic injection mold apparatus comprising a plurality of plates including a removable outer manifold plate, means defining a fluid passage through said plates, a torpedo heater disposed in said fluid passage and having an exposed outer surface over which fluid plastic material is directed during travel through said passage, said torpedo heater having tips at opposed upstream and downstream ends thereof and a mounting collar located intermediate said tips, and having upstream and downstream ends, said plates being formed with a first bore for receiving said torpedo heater collar, said plates being formed with a second bore, a removable bushing supported in said second bore between said outer manifold plate and an end of said second bore, said bushing having a downstream end formed with a recess for receiving the upstream end of said collar and for retaining said collar and torpedo heater in mounted position, said torpedo heater being formed with an internal bore at the location of each said tip, electrical heating means disposed in the bore of each said tip, electrical heating means disposed in the bore of each said tip for heating said tips, means for electrically coupling said heating means to a power source, and means for controlling the temperature of said heating means and thus the temperature of said tips.

31. A plastic injection mold apparatus comprising a plurality of plates, means defining a fluid passage through said plates, a torpedo heater disposed in said fluid passage and having an exposed outer surface over which fluid plastic material is directed during travel through said passage, said torpedo heater having tips at opposed ends thereof and a mounting collar located intermediate said tips, said plates being formed with a first bore for receiving said torpedo heater collar, said collar having an outwardly extending radial flange means for supporting said collar within said first bore and defining an air insulating space between said first bore and an outer peripheral portion of said collar, said plates being formed with a second bore, a removable bushing supported in said second bore between one of said plates and an end of said second bore for retaining said collar and torpedo heater in mounted position, said torpedo heater being formed with an internal bore at the location of each said tip, electrical heating means disposed in the bore of each said tip for heating said tips, means for electrically coupling said heating means to a power source, and means for controlling the temperature of said heating means and thus the temperature of said tips.

32. The plastic injection mold apparatus in claim 31 in which said radial flange means of said collar is adjacent a downstream end of said collar, and said air insulating space extends between said radial flange means and said bushing.

33. The plastic injection mold apparatus in claim 31 in which said bushing is formed with outwardly extending radial flange means for supporting said bushing within said second bore and for defining an air insulating space about an outer peripheral portion of said bushing.

34. The plastic injection mold apparatus in claim 33 in which said flange means of said bushing includes a pair of outwardly extending flanges adjacent opposite ends of said bushing and said air insulating space about the outer peripheral portion of said bushing extends between said pair of flanges.

* * * * *